(12) United States Patent
Minomo et al.

(10) Patent No.: US 9,757,973 B2
(45) Date of Patent: Sep. 12, 2017

(54) FILM FOR DECORATIVE FORMING AND PRODUCTION METHOD FOR DECORATIVE FORMED BODY

(71) Applicant: Toray Industries, Inc., Tokyo (JP)

(72) Inventors: Katsuhiro Minomo, Otsu (JP); Kentaro Mori, Otsu (JP)

(73) Assignee: Toray Industries, Inc. (JP)

( * ) Notice: Subject to any disclaimer, the term of this patent is extended or adjusted under 35 U.S.C. 154(b) by 252 days.

(21) Appl. No.: 14/400,468

(22) PCT Filed: May 28, 2013

(86) PCT No.: PCT/JP2013/064743
§ 371 (c)(1),
(2) Date: Nov. 11, 2014

(87) PCT Pub. No.: WO2013/183489
PCT Pub. Date: Dec. 12, 2013

(65) Prior Publication Data
US 2015/0129120 A1    May 14, 2015

(30) Foreign Application Priority Data
Jun. 8, 2012    (JP) .................................. 2012-130559

(51) Int. Cl.
*B32B 7/02*    (2006.01)
*B32B 27/32*    (2006.01)
(Continued)

(52) U.S. Cl.
CPC .......... *B44C 1/10* (2013.01); *B29C 45/14811* (2013.01); *B32B 7/12* (2013.01); *B32B 27/08* (2013.01); *B32B 27/32* (2013.01); *B32B 27/365* (2013.01); *B32B 27/40* (2013.01); *B44C 1/1712* (2013.01); *B44C 1/22* (2013.01); *B29C 45/14827* (2013.01); *B29K 2995/002* (2013.01); *B32B 2255/10* (2013.01);
(Continued)

(58) Field of Classification Search
None
See application file for complete search history.

(56) References Cited

U.S. PATENT DOCUMENTS

| | | | | |
|---|---|---|---|---|
| 2003/0138635 A1* | 7/2003 | Haruta | ..................... | B32B 27/08 428/413 |
| 2007/0229962 A1* | 10/2007 | Mason, Jr. | ........... | C11D 17/049 359/609 |
| 2009/0076222 A1* | 3/2009 | Pugne | ................ | C08G 18/0823 525/123 |

FOREIGN PATENT DOCUMENTS

| | | |
|---|---|---|
| JP | 11-245592 | 9/1999 |
| JP | 2000-158892 | 6/2000 |

(Continued)

*Primary Examiner* — David Sample
*Assistant Examiner* — Nicole Y Gugliotta
(74) *Attorney, Agent, or Firm* — DLA Piper LLP (US)

(57) ABSTRACT

A film for decorative forming includes a layered structure in which a protective layer and a colored layer are arranged sequentially in this order on a base material film, wherein, when a storage elastic modulus of the protective layer at 100° C. is written as E'a(100) and a storage elastic modulus of the colored layer at 100° C. is written as E'b(100), E'a(100) and E'b(100) satisfy conditions (1) to (3):
(1) E'a(100)/E'b(100) is less than or equal to 8,
(2) E'a(100) is greater than or equal to 10 MPa,
(3) E'b(100) is less than or equal to 12 MPa.

11 Claims, 1 Drawing Sheet

(51) Int. Cl.
  *B32B 27/36* (2006.01)
  *B32B 27/00* (2006.01)
  *B44C 1/10* (2006.01)
  *B29C 45/14* (2006.01)
  *B44C 1/22* (2006.01)
  *B32B 7/12* (2006.01)
  *B32B 27/08* (2006.01)
  *B32B 27/40* (2006.01)
  *B44C 1/17* (2006.01)

(52) U.S. Cl.
  CPC ..... *B32B 2255/26* (2013.01); *B32B 2307/402* (2013.01); *B32B 2307/4026* (2013.01); *B32B 2307/51* (2013.01); *B32B 2307/554* (2013.01); *B32B 2307/584* (2013.01); *B32B 2307/712* (2013.01); *B32B 2451/00* (2013.01); *Y10T 428/24942* (2015.01)

(56) References Cited

FOREIGN PATENT DOCUMENTS

| JP | 2001-9900 | 1/2001 |
|---|---|---|
| JP | 2003-27016 | 1/2003 |
| JP | 2003-238914 | 8/2003 |
| JP | 2004-2592 | 1/2004 |
| JP | 2006-248120 | 9/2006 |
| JP | 2008-105420 | 5/2008 |
| JP | 2009-234011 | 10/2009 |
| JP | 2009-234238 | 10/2009 |

* cited by examiner

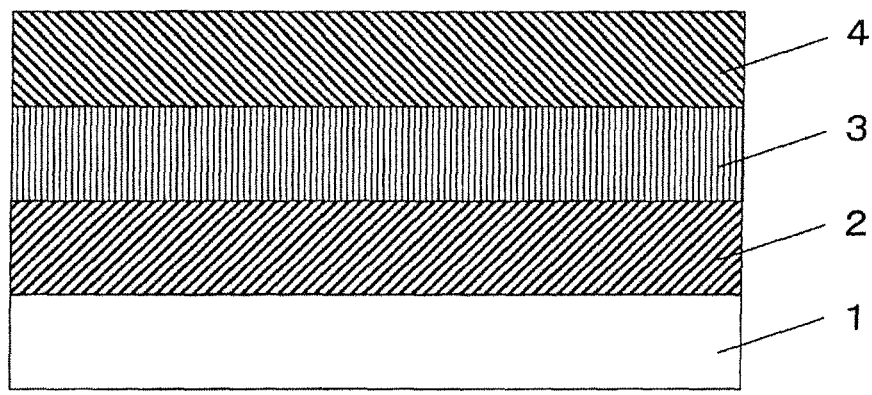

FILM FOR DECORATIVE FORMING AND PRODUCTION METHOD FOR DECORATIVE FORMED BODY

TECHNICAL FIELD

This disclosure relates to a film used to provide film decoration on decoration objects to be used in motor vehicle component parts, electrical appliances, portable terminals and the like, and relates to a film for decorative forming that is less subject to occurrence of cracking or shrinkage of a protective layer of a high-forming ratio portion even in a high-temperature atmosphere, and that has a good surface external appearance, and to a production method for a decorative formed body which uses the film.

BACKGROUND

As a decorating method for formed articles in motor vehicle component parts, electrical appliances and the like, film decorating methods, including vacuum forming methods, air-pressure forming methods and the like, are lately considered which are capable of decorating decoration objects that have three-dimensional shapes (Japanese Unexamined Patent Publication (Kokai) No. 2009-234011, Japanese Unexamined Patent Publication (Kokai) No. 2006-248120 and Japanese Unexamined Patent Publication (Kokai) No. 2003-27016).

With regard to existing films for decorative forming, forming at low ratios is assumed, and it is difficult to adapt the methods to decoration objects that are large in size or complicated in shape with projections and depressions. Furthermore, if a film for decorative forming has a layered structure of a protective layer and a colored layer to give a design to a decorative formed body, there is a need to consider the physical property of each coating film. In particular, high-forming ratio portions, when left in a high-temperature atmosphere, have problems of occurrence of a coating film contraction and therefore occurrence of a phenomenon such as cracking or shrinkage, in the decorative layer, or deterioration of external appearance or the like.

SUMMARY

We discovered that it is advantageous to provide a specific relation in storage elastic modulus between the protective layer and the colored layer in a film for decorative forming. We thus provide:

[1] A film for decorative forming which has a layered structure in which a protective layer and a colored layer are arranged sequentially in this order on a base material film, the film for decorative forming being characterized in that when a storage elastic modulus of the protective layer at 100° C. is written as E'a(100) and a storage elastic modulus of the colored layer at 100° C. written as E'b(100), E'a(100) and E'b(100) satisfy conditions (1) to (3) mentioned below.
(1) E'a(100)/E'b(100) is less than or equal to 8.
(2) E'a(100) is greater than or equal to 10 MPa.
(3) E'b(100) is less than or equal to 12 MPa.
[2] The film for decorative forming according to [1], wherein a stress of the protective layer at a 100% stretch at 100° C. is less than or equal to 0.3 MPa.
[3] The film for decorative forming according to [1] or [2], wherein a storage elastic modulus E'a(40) of the protective layer at 40° C. is 400 to 700 MPa.
[4] The film for decorative forming according to any one of [1] to [3], wherein a stress of the colored layer at the 100% stretch at 100° C. is less than or equal to 0.2 MPa.
[5] The film for decorative forming according to any one of [1] to [4], wherein a storage elastic modulus E'b(40) of the colored layer at 40° C. is 15 to 25 MPa.
[6] A production method for a decorative formed body, characterized by making a decorative formed body by sticking the film for decorative forming according to any one of [1] to [5] to a decoration object and then exfoliating the base material film.

Since the storage elastic moduli of the protective layer and the colored layer that constitute the film for decorative forming are set in specific ranges, it is possible, at the time of decoration of a decoration object that needs a high stretch ratio, to obtain a decorative formed body that is less subject to occurrence of cracking or shrinkage due to coating film contraction and allows less deterioration of external appearance even in a high-temperature atmosphere.

BRIEF DESCRIPTION OF THE DRAWING

FIG. 1 is a general sectional view of a film for decorative forming.

EXPLANATION OF NUMERALS

1: base material film
2: protective layer
3: colored layer
4: adhesion layer

DETAILED DESCRIPTION

The film for decorative forming has a layered structure in which a protective layer and a colored layer are arranged sequentially in this order on a base material film, and is characterized in that when the storage elastic moduli of the protective layer and the colored layer at 100° C. are written as E'a(100) and E'b(100), respectively, E'a(100) and E'b (100) satisfy conditions (1) to (3) mentioned below.
(1) E'a(100)/E'b(100) is less than or equal to 8.
(2) E'a(100) is greater than or equal to 10 MPa.
(3) E'b(100) is less than or equal to 12 MPa.
By making a film for decorative forming that has properties as mentioned above, it is possible to obtain a decorative formed body less subject to occurrence of cracking or shrinkage due to coating film contraction even in a high-temperature atmosphere (80 to 120° C.) and allows less deterioration of external appearance when the decoration with the film is performed on a decoration object that needs a high stretch ratio.

If E'a(100)/E'b(100) is greater than 8 in a high-temperature atmosphere, the protective layer and the colored layer may have differences in their behaviors such as softening or thermal contraction, and the protective layer becomes likely to have cracking or shrinkage. Particularly, in a portion stretched at 200% or more in terms of area percentage, the occurrence of cracking or shrinkage is sometimes conspicuous.

If the storage elastic modulus of the colored layer is excessively smaller than the storage elastic modulus of the protective layer, the intended function of the protective layer cannot be performed. Therefore, E'a(100)/E'b(100) is desired to be greater than or equal to 1. In view of the surface hardness, E'a(100)/E'b(100) is preferred to be greater than or equal to 2. If E'a(100)/E'b(100) is less than 1, the storage elastic modulus of the protective layer becomes low so that when pressure is applied to the surface of the protective layer and therefore the protective layer deforms, the colored layer may sometimes fail to follow the deformation of the protective layer and therefore trace of the deformation may be likely to be left on the protective layer.

Base Material Film

As for the base material film, a film whose fracture elongation at 100° C. is greater than or equal to 200% is preferably used. For example, films obtained by processing thermoplastic resins such as polyolefin, polyester, polyvinyl chloride, poly(meth)acrylic ester, polyamide, polyester amide, polyether, polystyrene, polyether ester, polycarbonate, etc., can be cited. The base material film may be any one of an unstretched film, a uniaxially stretched film and a biaxially stretched film.

A protective layer-side surface of the base material film needs to have mold releasability with respect to the protective layer. Having mold releasability means that the base material film and the protective layer can be exfoliated from each other. As the means of adjusting the mold releasability between the protective layer-side surface of the base material film and the protective layer, means as follows can be cited. For example, as means of enhancing the mold releasability, there can be cited co-extruding or laminating a layer having mold releasability such as polyolefin, on a side (protective layer-side) surface of the base material film and therefore forming a composite film, and coating a mold release agent and therefore forming a composite film, and as a means of lowering the mold releasability, there can be cited performing a corona process on a side (protective layer-side) surface of a mono-layer film or a composite film and adjusting the wetting tension and the like.

The thickness of the base material film is preferred to be 50 to 500 μm and is more preferred to be 75 to 200 μm, in respect of the breaking strength and the shape retainability of decorative formed bodies after forming. As for measurement of the thickness, if it is performed during the production process of the film for decorative forming, the thickness can be calculated by performing measurement using a micrometer according to JIS C 2151 (2006 edition) every time a layer is formed. Furthermore, during a state in which the protective layer and/or the colored layer is layered on the base material film, the thickness of the base material film can be measured by observing a cross section thereof under a differential interference microscope, a laser microscope, an electron microscope or the like.

Protective Layer

Since the protective layer used in the film for decorative forming assumes the position of the outermost surface layer when applied to a decorative formed body, the resin used in the protective layer is preferred to be a resin that does not impair formability of the film for decorative forming, and to be a resin that has design characteristics including transparency and lustrousness, and coating film characteristics including abrasion resistance, impact resistance, chemical resistance and weather resistance.

$E'a(100)$ of the protective layer is preferred to be greater than or equal to 10 MPa. If $E'a(100)$ is less than 10 MPa, there occur cases where the protective layer declines in thermal resistance and fails to perform its function, for example, when a thing is placed on the decorative formed body in a high-temperature atmosphere, a depressed trace is left on the surface. Furthermore, since when the residual stress in a high-stretch ratio portion becomes large so that coating film contraction occurs in a high-temperature atmosphere after forming, $E'a(100)$ is preferred to be less than or equal to 50 MPa. In particular, it is preferred to be less than or equal to 40 MPa. Furthermore, the stress of the protective layer at 100% stretch at 100° C. is preferred to be less than or equal to 0.3 MPa. If the stress at 100% stretch at 100° C. is greater than 0.3 MPa, coating film contraction may occur in a high-temperature atmosphere after forming, as is the case with $E'a(100)$ being greater than 50 MPa.

$E'a(40)$ of the protective layer is preferred to be 400 to 700 MPa. Herein, $E'a(40)$ refers to the storage elastic modulus of the protective layer at 40° C. If $E'a(40)$ is less than 400 MPa, the protective layer is easily scratched on the surface, and therefore may be the protective layer is insufficient in terms of abrasion resistance. If $E'a(40)$ is greater than 700 MPa, when a curved surface is formed, the protective layer may be excessively hard so that cracking forms in the protective layer.

As for the method of adjusting the storage elastic modulus of the protective layer, although the method is not particularly limited, the storage elastic modulus of the protective layer can be adjusted by mixing a plurality of resins, adjusting the crosslink density of resin, or adding a hardening agent or a plasticizer to a resin coating material.

As for the method of measuring the storage elastic modulus of the protective layer, the storage elastic modulus thereof can be measured by using a method mentioned in conjunction with the working examples. When the protective layer already exists, layered together with a base material film and/or a colored layer, it suffices that the storage elastic modulus of the protective layer is measured by using a method mentioned in conjunction with working examples after the other layer or layers are removed by polishing.

As the resin for use in the protective layer, there can be cited, for example, a thermo-hardening resin and a photo-hardening resin (including a UV hardening resin). As the thermo-hardening resin, there can be cited, for example, a polycarbonate resin, an acrylic resin, a polyester resin, a phenoxy resin, an epoxy resin, a polyolefin resin, etc. Furthermore, as the photo-hardening resin, it is permissible to use, for example, at least one species selected from the group consisting of a urethane acrylate resin, a polyester acrylate resin, an unsaturated polyester resin, a silicone acrylate resin and an epoxy acrylate resin, and, according to need, together with a photo-setting initiator agent or the like mixed with the resin.

Of course, these resins may be mixed according to need with a hardening agent, a hardening accelerator, a binding agent, a surface conditioner, a pigment, an ultraviolet absorber, a light stabilizer and the like. Furthermore, the resin may be a copolymer, or may also be a mixture with different kinds of resins. Incidentally, if a photo-cure resin is used, it is desirable to perform the hardening process after forming because this can secure better formability.

The total of the contents of the resins and the additives excluding the thermo-hardening resin or the photo-hardening resin used in the protective layer is preferred to be less than or equal to 10 wt %, and is more preferred to be less than or equal to 5 wt %, relative to the total mass of the protective layer as a reference. If a resin other than the thermo-hardening resin and the photo-hardening resin is contained in an amount larger than the foregoing range, there occur cases where the protective layer fails to deliver its intended performance.

The thickness of the protective layer is preferably 10 to 70 μm, and more preferably 20 to 50 μm. If the thickness thereof is greater than or equal to 10 μm, the thickness is preferable because the coating film property can be further improved. Furthermore, if the thickness thereof is less than or equal to 70 μm, the thickness is preferable because the flatness of the surface is better, making it easier to form the colored layer on the surface. As for measurement of the thickness thereof, if it is performed during the production process of the film for decorative forming, the thickness can be calculated by performing measurement using a micrometer according to JIS C 2151 (2006 edition) every time a layer is formed. Furthermore, during a state in which the base material film is layered on the protective layer, the thickness of the protective layer can be measured by observing a cross section thereof under a differential interference microscope, a laser microscope, an electron microscope or the like.

Colored Layer

The colored layer used in the film for decorative forming is a layer that has a function of giving a decoration object to be decorated a color and a texture that are intended, and that has a concealing characteristic when formed into a decorative formed body. As the colored layer, there can be cited, for example, a layer constructed of a colored resin in which a binder resin and a pigment are mixed, an ink, a metal thin film and the like. In light of avoidance of impairment of formability of the film for decorative forming and the ease of adjustment of the storage elastic modulus in the present invention, a layer constructed by a colored resin in which a binder resin and a pigment are mixed (herein, sometimes simply termed the colored resin layer) is the most preferable.

$E'b(100)$ of the colored layer is preferred to be less than or equal to 12 MPa. If $E'b(100)$ is greater than 12 MPa, the forming stress at the time of stretch increases so that the orientation of the pigment contained in the colored layer is disturbed, which sometimes becomes a cause of deterioration of external appearance. Furthermore, when the decorated body is left standing in a high-temperature atmosphere, the colored layer may soften, and wrinkling or crackling may occur as a result of failing to withstand the thermal contraction of the protective layer. Therefore, $E'b(100)$ is preferred to be greater than or equal to 5 MPa. Furthermore, the stress of the colored layer at 100% stretch at 100° C. is preferred to be less than or equal to 0.2 MPa. If the stress at 100% stretch at 100° C. is greater than 0.2 MPa, the orientation of the pigment contained in the colored layer may be disturbed, which sometimes becomes a cause of deterioration of external appearance, as in the case where $E'b(100)$ is greater than 12 MPa.

$E'b(40)$ of the colored layer is preferred to be 15 to 25 MPa. $E'b(40)$ refers to the storage elastic modulus of the colored layer at 40° C. If $E'b(40)$ is less than 15 MPa when pressure is applied from above the formed body, trace of deformation of the colored layer is likely to remain. Furthermore, if $E'b(40)$ is greater than 25 MPa, deformation of the formed body from above cannot be followed and therefore cracking occurs.

As for the method of adjusting the storage elastic modulus of the colored layer, although the method is not particularly limited, the storage elastic modulus of the colored layer can be adjusted by a method of mixing a plurality of resins, a method of adjusting the crosslink density of resin, a method of adding a hardening agent or a plasticizer to a resin coating material, a method of changing the amount of pigment contained in resin and the like.

As for the method of measuring the storage elastic modulus of the colored layer, the storage elastic modulus thereof can be measured by using a method mentioned in conjunction with working examples. When the colored layer already exists, layered together with a base material film and/or a protective layer, it suffices that the storage elastic modulus of the colored layer is measured by using a method mentioned in conjunction with the working examples after the other layer or layers are removed by polishing.

When a colored resin layer is used as the colored layer, any one of a thermo-hardening resin, a thermoplastic resin and a photo-hardening resin (including a UV hardening resin) may be used as a binder resin to be mixed in. As the thermo-hardening resin, there can be cited, for example, an unsaturated polyester resin, a phenol resin, an epoxy resin, an acrylic resin, a urethane resin, a melamine resin, a urea resin, a polycarbonate resin and the like.

Furthermore, as the thermoplastic resin, there can be cited, for example, a polyethylene resin, a polypropylene resin, a polycarbonate resin, an acrylic resin, a polystyrol resin, etc. Furthermore, as the photo-hardening resin, there can be cited, for example, a urethane acrylate resin, a polyester acrylate resin, an unsaturated polyester resin, a silicone acrylate resin, an epoxy acrylate resin and the like. If necessary, a resin mixed with its photoinitiator or the like may be used. A mixture of at least one resin selected from the aforementioned resins may be used.

From the viewpoints of adjusting such a resin to an arbitrary color by adding a pigment to the resin, and of the coating characteristic at the time of forming a colored layer of a film for decorative forming, it is preferred to provide the aforementioned resin in a solvent solution or an aqueous dispersion. As the method of making the solvent solution or the aqueous dispersion, known techniques can be employed.

Furthermore, these resins may be mixed according to need with a hardening agent, a hardening accelerator, a binding agent, a surface conditioner, a dye, a plasticizer, an ultraviolet absorber, a light stabilizer and the like.

Furthermore, the resin may be a copolymer, or may also be a mixture of different kinds of resins. In the present invention, a thermo-hardening resin can be preferably used because the thereto-hardening resin is easy to handle and is low cost.

As the pigment, either one of an inorganic pigment and an organic pigment, for example, aluminum powder, carbon black, titanium dioxide, mica, phthalocyanine green, dioxazine violet, and the like, may be used. Such pigments may be singly used, or may also be used in a mixture of two or more species thereof. The concentration of the pigment may be adjusted within a range such that the fracture elongation of the binder resin will not be inhibited.

The thickness of the colored layer in the present invention is preferably 15 to 50 μm, and more preferably 20 to 40 μm. If the thickness thereof is greater than or equal to 15 μm, the thickness is preferable because a colored layer having a desired coloring can easily be obtained. Furthermore, if the thickness thereof is less than or equal to 50 μm, the thickness is also preferable because the flatness of the surface becomes better and it becomes easy to form an adhesion layer on top of the colored layer. As for the measurement of the thickness thereof, if it is performed during the production process of the film for decorative forming, the thickness can be calculated by performing measurement using a micrometer according to JIS C 2151 (2006 edition) every time a layer is formed. Furthermore, during a state in which the base material film and/or the protective layer is layered, the thickness of the colored layer can be measured by observing a cross section thereof under a differential interference microscope, a laser microscope, an electron microscope or the like.

Adhesion Layer

The film for decorative forming may further include an adhesion layer on top of the colored layer. Because heat at the time of forming make it possible to stretch the film for decorative forming and simultaneously stick the film to a decoration object, it is preferred to use an adhesive that thermally reacts, such as a hot melt adhesive or a thermohardening adhesive. As for a component of the adhesion layer, there is no particular limit as long as the component has an adhering property to a decoration object; for example, an acryl-based adhesive, a urethane-based adhesive, a polyester-based adhesive, an olefin-based adhesive, etc. can be cited.

Production Method for Decorative Molded Body

As the production method for a decorative formed body, there can be cited a production method for a decorative formed body in which the decorative formed body is made by sticking the foregoing film for decorative forming to a decoration object and then exfoliating the base material film therefrom. When a film for decorative forming is to be stuck to a decoration object, it is preferred to apply a known thermal forming method in which a film for decorative forming can be stuck to a three-dimensionally configured decoration object, such as a reduced-pressure forming method (which is sometimes referred to also as a vacuum forming method), a pressurized air forming method and the like. Among these methods, in view of the formability of the film for decorative forming and the adhesion property to the decoration object, it is preferred to employ a forming method in which under a reduced-pressure condition, the film for decorative forming is heated to a temperature that is higher than or equal to its softening point, and the adhesion layer of the film is brought into contact with the surface of a decoration object, and is stuck to the decoration object by thermal forming, because it becomes possible to reduce the number of processes of performing decoration on the decoration object so that the production efficiency of the decorative formed body will improve compared to a known decorative method based on spray coating that requires multiple steps of process.

EXAMPLES

Our films and methods will be described with reference to examples, but is not limited to these examples.

Evaluation Method

1. Storage Elastic Moduli of Protective Layer and Colored Layer at 40° C. AND 100° C.

A mold release film ("Cerapeel" (registered trademark), made by TORAY ADVANCED FILM Co., Ltd.) was used to prepare samples. After a coating material to be measured was coated on the mold release surface of the mold release film by an applicator method so that the post-drying thickness would become 40 μm, the coating material was dried at 80° C. for 30 minutes to make a mono-layer sample.

The sample was cut out into rectangles of 60 mm long×10 mm wide. Using a dynamic viscosity measurement device (DMS6100, made by Seiko Instruments Inc.), the storage elastic moduli thereof at 40° C. and 100° C. were found under the following conditions.

Frequency: 1 Hz
Sample length: 20 mm
Minimum load: about 10 mN
Amplitude: 10 μm
Measurement temperature range: 25° C. to 150° C.
Temperature rise speed: 2° C./min 2. Stress at 100% Stretch, and Formability Mono-layer samples of the protective layer and the colored layer were prepared by substantially the same method as was used to prepare the samples according to the foregoing section 1. The samples were cut into 10 mm in width and 50 mm in length to obtain measurement samples. Using a tensile tester (made by ORIENTEC, Tensilon UCT-100), each sample, which was set in the tester so that the tensile chuck distance was 20 mm, was subjected to a tensile test at a tensile speed of 200 mm/min. As for the measurement, each film sample was set in a constant temperature oven set at a temperature of 100° C., and, after 60 seconds of pre-heating, the tensile test was performed in the contact temperature oven to find a stress at 100% stretch exhibited (at the time point when the sample became 40 mm). The measurement was performed at three points for each sample, and an average value of the measurements at the three points was used for evaluation. A reference value of the stress of the protective layer at 100% stretch was set at 0.3 MPa and a reference value of the stress of the colored layer at 100% stretch was set at 0.2 MPa. The samples of which the protective layer or colored layer had a stress at 100% stretch that is less than or equal to the reference value were evaluated as formability A, and the other samples were evaluated as formability B. The samples with formability A were considered as being good in the formability of the film for decorative forming.

3. Heat Resistance

Using a TOM forming machine (made by Fu-se Vacuum Forming Ltd., NGF0406-T), each film for decorative forming, which was set so that the adhesion layer side of the film and the largest-area surface of a to-be-decorated formed body faced each other, was subjected to molding under the following conditions to make a decorative formed body. As for the stretch ratio of each film for decorative forming, the depth of a box-shaped hollow of the TOM molding machine was adjusted. Concretely, the distance from the set film to the bottom surface of the box-shaped hollow was set to 85 mm.

Forming temperature: 110° C.
Heater output: 200% for rapid heating, 80% for normal heating
Rapid heating time: 10 seconds
Vacuum pressure: 0 kPa
Compressed-air pressure: 300 kPa
Compressed-air time: 15 seconds
Small amount of atmospheric release: 2 seconds As a to-be-decorated formed body, a flat planar resin formed body of 250 mm long×100 mm wide×3 mm thick made of a polyolefin resin (TSOP GP6BS, made by Prime Polymer Co., Ltd.) was used.

After forming, the base material film was exfoliated to obtain a decorative formed body. The obtained decorative formed body was left standing in a hot air oven at 80° C. for 24 hours, and then was taken out to check the external appearance thereof. As criteria of the external appearance, the presence or absence of cracking and shrinkage of the decorative layer was checked. Cracking means a state in which one or more of the layers have a crack. Shrinkage means a state in which the coating film has contracted by 5 mm or more from an end portion of the decorative formed body. The samples whose external appearance did not exhibit cracking or shrinkage were evaluated as A, and the other samples were evaluated as B.

4. Forming External Appearance

The protective layer side of a decorative formed body made by a method comparable to that described in conjunction with the foregoing section 3 was subjected to measurement of the intensities of undulation at undulation wavelengths W1 to W4, by using a MICRO-WAVE-SCAN T (made by BYK-Gardner company). Herein, the intensities of undulation at each of the undulation wavelengths W1 to W4 is an intensity obtained by scanning the sample surface while irradiating the surface with a laser beam, and detecting the intensity (diffusion, condensation) of the reflected beam by a sensor, analyzing the intensity and converting it into numerical values. Smaller numerical values of the intensity mean that the undulation that corresponds to the undulation wavelengths W1 to W4 is less, and that the sample surface is smoother.

The undulation wavelengths and reference intensity values of the undulation are shown below. The samples whose undulation intensities of the undulation wavelengths were all less than or equal to the reference intensity values were evaluated as A, and the samples whose undulation intensities of the undulation wavelengths included at least one intensity that was greater than the reference intensity value were evaluated as B.

Undulation Wavelengths and Reference Intensity Values of Undulation Intensity

Undulation wavelength W1 (wavelength greater than or equal to 2.4 mm): reference intensity value of 22

Undulation wavelength W2 (wavelength greater than or equal to 0.8 mm and less than 2.4 mm): reference intensity value of 40

Undulation wavelength W3 (wavelength greater than or equal to 0.32 mm and less than 0.8 mm): reference intensity value of 35

Undulation wavelength W4 (wavelength less than 0.32 mm): reference intensity value of 20

5. Pencil Hardness

A pencil (6B) was set at an angle of 45 degrees to the protective layer side of a decorative formed body made by a method comparable to the method mentioned in conjunction with the section 3. With a load of 200 g applied from above, the pencil was moved about 10 mm to scratch the surface. Then, the presence or absence of depression on the surface was visually checked. The samples without a flaw were evaluated as A, the samples that had slight depression but no practical problem were evaluated as B, and the samples on which depression was clear were evaluated as C. The samples evaluated as A or B were evaluated as being good in pencil hardness, and the samples evaluated as C were evaluated as being not good in pencil hardness. Results are shown in Table 1.

TABLE 1

| | | Unit | Example 1 | Example 2 | Example 3 | Example 4 | Example 5 | Example 6 | Example 7 |
|---|---|---|---|---|---|---|---|---|---|
| Raw materials for forming protective layer | Polycarbonate-based polyurethane resin emulsion coating material | Mass part(s) | 100 | 100 | 100 | 100 | 100 | 100 | 100 |
| | Carbodiimide-based hardening agent | Mass part(s) | 1 | 1 | 0.5 | 0.5 | 1 | 0.5 | 0 |
| Raw materials for forming colored layer | Coating material for forming colored layer | Mass part(s) | 100 | 100 | 100 | 100 | 100 | 100 | 100 |
| | Isocyanate coating material (hardening agent) | Mass part(s) | 1 | 0.5 | 1 | 0.5 | 1.5 | 1.5 | 1.5 |
| Properties of layers | E'a(100) | MPa | 40 | 40 | 20 | 20 | 40 | 20 | 10 |
| | E'b(100) | MPa | 8 | 5 | 8 | 5 | 11 | 11 | 11 |
| | E'a(100)/E'b(100) | | 5.0 | 8.0 | 2.5 | 4.0 | 3.6 | 1.8 | 0.9 |
| | E'a(40) | MPa | 700 | 700 | 400 | 400 | 700 | 400 | 200 |
| | E'b(40) | MPa | 25 | 15 | 25 | 15 | 40 | 40 | 40 |
| | Stress of protective layer at 100% stretch | MPa | 0.1 | 0.1 | 0.05 | 0.05 | 0.1 | 0.05 | 0.03 |
| | Stress of colored layer at 100% stretch | MPa | 0.1 | 0.05 | 0.1 | 0.05 | 0.2 | 0.2 | 0.2 |
| Evaluation of decorative formed body | Formability | | A | A | A | A | A | A | A |
| | Heat resistance | | A | A | A | A | A | A | A |
| | Formed external appearance | | A | A | B | A | A | B | B |
| | Pencil hardness | | A | A | B | A | B | B | B |

| | | Unit | Comparative Example 1 | Comparative Example 2 | Comparative Example 3 | Comparative Example 4 | Comparative Example 5 |
|---|---|---|---|---|---|---|---|
| Raw materials for forming protective layer | Polycarbonate-based polyurethane resin emulsion coating material | Mass part(s) | 100 | 100 | 100 | 100 | 100 |
| | Carbodiimide-based hardening agent | Mass part(s) | 1 | 0.5 | 2 | 2 | 2 |
| Raw materials for forming | Coating material for forming colored layer | Mass part(s) | 100 | 100 | 100 | 100 | 100 |

TABLE 1-continued

| | | | | | | | |
|---|---|---|---|---|---|---|---|
| colored layer | Isocyanate coating material (hardening agent) | Mass part(s) | 2 | 2 | 1 | 0.5 | 2 |
| Properties of layers | E'a(100) | MPa | 40 | 20 | 80 | 80 | 80 |
| | E'b(100) | MPa | 15 | 15 | 8 | 5 | 15 |
| | E'a(100)/E'b(100) | | 2.7 | 1.3 | 10.0 | 16.0 | 5.3 |
| | E'a(40) | MPa | 700 | 400 | 1500 | 1500 | 1500 |
| | E'b(40) | MPa | 60 | 60 | 25 | 15 | 60 |
| | Stress of protective layer at 100% stretch | MPa | 0.1 | 0.05 | 0.5 | 0.5 | 0.5 |
| | Stress of colored layer at 100% stretch | MPa | 0.3 | 0.3 | 0.1 | 0.05 | 0.3 |
| Evaluation of decorative formed body | Formability | | B | B | B | B | B |
| | Heat resistance | | A | A | B | B | A |
| | Formed external appearance | | C | C | A | A | C |
| | Pencil hardness | | C | C | A | A | B |

Example 1

As a base material film, a film obtained by dry-laminating a 100 μm-thick unstretched polyethylene terephthalate film (FL10, made by Toray Industries, Inc.) and a 40 μm-thick unstretched polypropylene film (SC, made by TOH CELLO CO., LTD.) with a urethane-based adhesive was used. A mixture obtained by adding and mixing 1 mass part of a carbodiimide-based hardening agent ("CARBODILITE" (registered trademark) V-02, made by Nisshinbo Chemical Inc.) into 100 mass parts of a polycarbonate-based polyurethane resin emulsion coating material ("PERMARIN" (registered trademark) UA-310, made by Sanyo Chemical Industries, Ltd.) was coated on the polypropylene film side of a base material film by the applicator method so that the post-drying thickness would become 40 μm. Then, the mixture was dried at 80° C. for 30 minutes to form a protective layer.

Next, a mixture obtained by adding and mixing 1 mass part of an isocyanate coating material ("TAKENATE" (registered trademark) 500, made by Mitsui Chemicals, Inc.) into 100 mass parts of a coating material (R2325, made by NIPPON BEE CHEMICAL CO., LTD.) for forming a colored layer on the protective layer was coated by the applicator method so that the post-drying thickness would become 40 μm. Then, the mixture was dried at 80° C. for 30 minutes to form a colored layer.

Next, a coating material (M-28, made by Toyobo Co., Ltd.) for forming an adhesion layer was coated on the formed colored layer by the applicator method so that the post-drying thickness would become 20 μm. Then, the coating material was dried at 80° C. for 30 minutes to form an adhesion layer. Thus, a film for decorative forming was obtained.

Evaluation results of the decorative layer and the decorative formed body obtained are shown in Table 1.

Example 2

A decorative formed body was obtained in substantially the same method as in Example 1, except that, to form a colored layer, a mixture obtained by adding and mixing 0.5 mass part of an isocyanate coating material ("TAKENATE" (registered trademark) 500, made by Mitsui Chemicals, Inc.) into 100 mass parts of a coating material (R2325, made by NIPPON BEE CHEMICAL CO., LTD.) for forming the colored layer was used.

Evaluation results of the decorative layer and the decorative formed body obtained are shown in Table 1.

Example 3

A decorative formed body was obtained by substantially the same method as in Example 1, except that, to form a protective layer, a mixture obtained by adding and mixing 0.5 mass part of a carbodiimide-based hardening agent ("CARBODILITE" (registered trademark) V-02, made by Nisshinbo Chemical Inc.) into 100 mass parts of a polycarbonate-based polyurethane resin emulsion coating material ("PERMARIN" (registered trademark) UA-310, made by Sanyo Chemical Industries, Ltd.) was used.

Evaluation results of the decorative layer and the decorative formed body obtained are shown in Table 1.

Example 4

A decorative formed body was obtained by substantially the same method as in Example 3, except that, to form a colored layer, a mixture obtained by adding and mixing 0.5 mass part of an isocyanate coating material ("TAKENATE" (registered trademark) 500, made by Mitsui Chemicals, Inc.) into 100 mass parts of a coating material (R2325, made by NIPPON BEE CHEMICAL CO., LTD.) for forming the colored layer was used.

Evaluation results of the decorative layer and the decorative formed body obtained are shown in Table 1.

Example 5

A decorative formed body was obtained by substantially the same method as in Example 1, except that, to form a colored layer, a mixture obtained by adding and mixing 1.5 mass parts of an isocyanate coating material ("TAKENATE" (registered trademark) 500, made by Mitsui Chemicals, Inc.) into 100 mass parts of a coating material (R2325, made by NIPPON BEE CHEMICAL CO., LTD.) for forming the colored layer was used.

Evaluation results of the decorative layer and the decorative formed body obtained are shown in Table 1.

Example 6

A decorative formed body was obtained by substantially the same method as in Example 3, except that, to form a colored layer, a mixture obtained by adding and mixing 1.5 mass parts of an isocyanate coating material ("TAKENATE" (registered trademark) 500, made by Mitsui Chemicals, Inc.) into 100 mass parts of a coating material (R2325, made by NIPPON BEE CHEMICAL CO., LTD.) for forming the colored layer was used.

Evaluation results of the decorative layer and the decorative formed body obtained are shown in Table 1.

Example 7

A decorative formed body was obtained by substantially the same method as in Example 5, except that, to form a protective layer, only a polycarbonate-based polyurethane resin emulsion coating material ("PERMARIN" (registered trademark) UA-310, made by Sanyo Chemical Industries, Ltd.) was used.

Evaluation results of the decorative layer and the decorative formed body obtained are shown in Table 1.

Comparative Example 1

A decorative formed body was obtained by substantially the same method as in Example 1, except that, to form a colored layer, a mixture obtained by adding and mixing 2 mass parts of an isocyanate coating material ("TAKENATE" (registered trademark) 500, made by Mitsui Chemicals, Inc.) into 100 mass parts of a coating material (R2325, made by NIPPON BEE CHEMICAL CO., LTD.) for forming the colored layer was used.

Evaluation results of the decorative layer and the decorative formed body obtained are shown in Table 1.

Comparative Example 2

A decorative formed body was obtained by substantially the same method as in Comparative Example 1, except that, to form a protective layer, a mixture obtained by adding and mixing 0.5 mass part of a carbodiimide-based hardening agent ("CARBODILITE" (registered trademark) V-02, made by Nisshinbo Chemical Inc.) into 100 mass parts of a polycarbonate-based polyurethane resin emulsion coating material ("PERMARIN" (registered trademark) UA-310, made by Sanyo Chemical Industries, Ltd.) was used.

Evaluation results of the decorative layer and the decorative formed body obtained are shown in Table 1.

Comparative Example 3

A decorative formed body was obtained by substantially the same method as in Example 1, except that, to form a protective layer, 2 mass parts of a carbodiimide-based hardening agent ("CARBODILITE" (registered trademark) V-02, made by Nisshinbo Chemical Inc.) into 100 mass parts of a polycarbonate-based polyurethane resin emulsion coating material ("PERMARIN" (registered trademark) UA-310, made by Sanyo Chemical Industries, Ltd.) was used.

Evaluation results of the decorative layer and the decorative formed body obtained are shown in Table 1.

Comparative Example 4

A decorative formed body was obtained by substantially the same method as in Comparative Example 3, except that, to form a colored layer, a mixture obtained by adding and mixing 0.5 mass part of an isocyanate coating material ("TAKENATE" (registered trademark) 500, made by Mitsui Chemicals, Inc.) into 100 mass parts of a coating material (R2325, made by NIPPON BEE CHEMICAL CO., LTD.) for forming the colored layer was used.

Evaluation results of the decorative layer and the decorative formed body obtained are shown in Table 1.

Comparative Example 5

A decorative formed body was obtained by substantially the same method as in Comparative Example 3, except that, to form a colored layer, a mixture obtained by adding and mixing 2 mass parts of an isocyanate coating material ("TAKENATE" (registered trademark) 500, made by Mitsui Chemicals, Inc.) into 100 mass parts of a coating material (R2325, made by NIPPON BEE CHEMICAL CO., LTD.) for forming the colored layer was used.

Evaluation results of the decorative layer and the decorative formed body obtained are shown in Table 1.

INDUSTRIAL APPLICABILITY

The film for decorative forming can be preferably used in decoration of motor vehicle component parts and electrical appliances, and can be preferably applied to uses in which design property is needed and functions such as heat resistance, are required.

The invention claimed is:

1. A film for decorative forming comprises a layered structure in which a protective layer and a colored layer are arranged sequentially in this order on a base material film, wherein, when a storage elastic modulus of the protective layer at 100° C. is written as E'a(100) and a storage elastic modulus of the colored layer at 100° C. is written as E'b(100), E'a(100) and E'b(100) satisfy conditions (1) to (3):
   (1) E'a(100)/E'b(100) is greater than or equal to 1 and less than or equal to 8,
   (2) E'a(100) is greater than or equal to 10 MPa and less than or equal to 50 MPa,
   (3) E'b(100) is greater than or equal to 5 MPa and less than or equal to 12 MPa.

2. The film according to claim 1, wherein a stress of the protective layer at a 100% stretch at 100° C. is less than or equal to 0.3 MPa.

3. The film according to claim 1, wherein a storage elastic modulus E'a(40) of the protective layer at 40° C. is 400 to 700 MPa.

4. The film according to claim 1, wherein a stress of the colored layer at the 100% stretch at 100° C. is less than or equal to 0.2 MPa.

5. The film according to claim 1, wherein a storage elastic modulus E'b(40) of the colored layer at 40° C. is 15 to 25 MPa.

6. The film according to claim 2, wherein a storage elastic modulus E'a(40) of the protective layer at 40° C. is 400 to 700 MPa.

7. The film according to claim 2, wherein a stress of the colored layer at the 100% stretch at 100° C. is less than or equal to 0.2 MPa.

8. The film according to claim 3, wherein a stress of the colored layer at the 100% stretch at 100° C. is less than or equal to 0.2 MPa.

9. The film according to claim 2, wherein a storage elastic modulus E'b(40) of the colored layer at 40° C. is 15 to 25 MPa.

10. The film according to claim 3, wherein a storage elastic modulus E'b(40) of the colored layer at 40° C. is 15 to 25 MPa.

11. The film according to claim 4, wherein a storage elastic modulus E'b(40) of the colored layer at 40° C. is 15 to 25 MPa.

* * * * *